No. 879,769. PATENTED FEB. 18, 1908.
N. HIGHT.
KNOCKDOWN PLANT BOX.
APPLICATION FILED MAY 22, 1907.
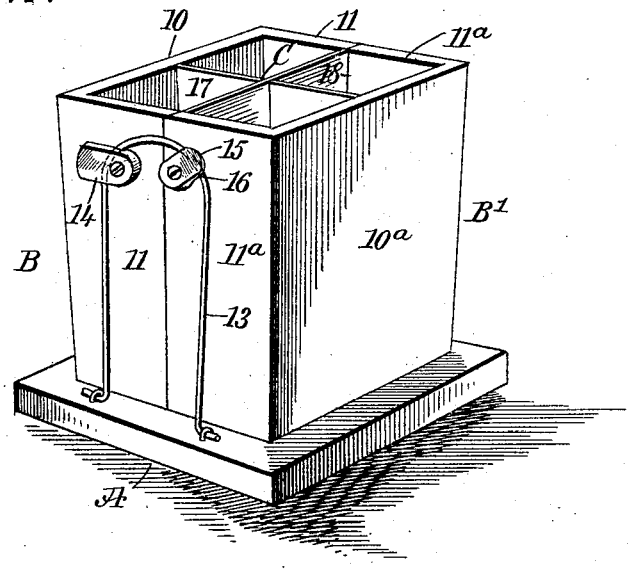
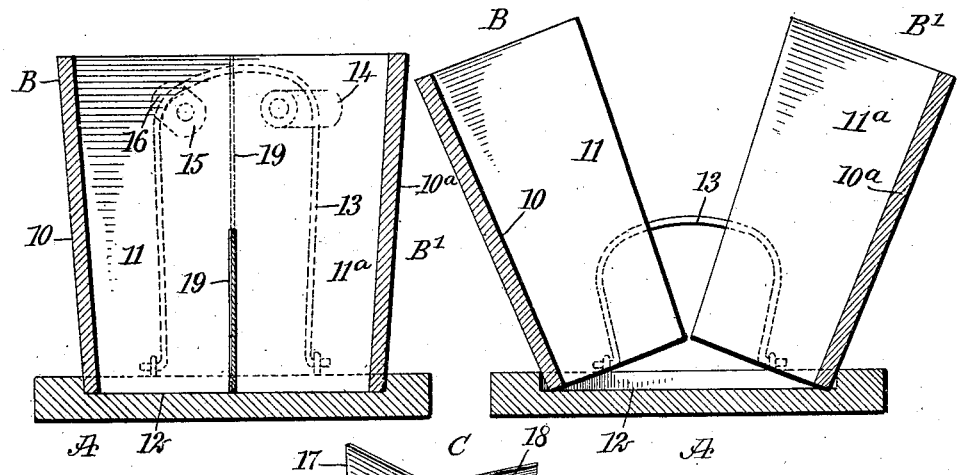
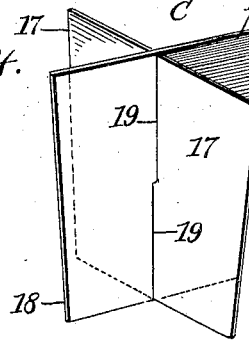
WITNESSES
INVENTOR
Nelson Hight
BY
ATTORNEYS

UNITED STATES PATENT OFFICE.

NELSON HIGHT, OF WOLFBORO, NEW HAMPSHIRE.

KNOCKDOWN PLANT-BOX.

No. 879,769.   Specification of Letters Patent.   Patented Feb. 18, 1908.

Application filed May 22, 1907. Serial No. 374,989.

*To all whom it may concern:*

Be it known that I, NELSON HIGHT, a citizen of the United States, and a resident of Wolfboro, in the county of Carroll and State of New Hampshire, have invented a new and useful Improvement in Knockdown Plant-Boxes, of which the following is a full, clear, and exact description.

The purpose of the invention is to provide a very simple, durable, and readily operated box in which to grow plants, so constructed that the body portion is in sections separable from each other and from the bottom, means being provided for holding the parts closely assembled, while the plants are growing in the box, which locking means can be quickly and conveniently cast off to provide for separation of the parts and a practically complete exposure of the earth in which the roots are contained, enabling the plants to be removed and transplanted with their mother earth intact.

It is a further purpose of the invention to provide the box with a removable partition whereby the box may be divided into compartments for growing individual plants, enabling each plant with its accompanying earth to be independently removed when transplanting.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a perspective view of the improved box with its parts locked in position for use; Fig. 2 is a vertical section through the box with the parts in the position shown in Fig. 1; Fig. 3 is a section through the box, its parts being shown in the act of separation; and Fig. 4 is a detail perspective view of the partition for the box.

The box consists primarily of a bottom or base A, and a body, the body being divided into two members B and B'. The bottom or base A is provided with a recess 12 in its upper face, that receives the bottom portion of the body of the box when the parts thereof are assembled. The bottom and likewise the body of the box may be of any desired shape; in the drawings they are shown rectangular, but the contour of the recess 12 in the base or bottom A must conform to the contour of the body of the box at its bottom portion. The members B and B' of the box body are of identical construction, the member B consisting of a full panel 10 and two opposing partial panels 11, while the opposing member B' consists of a full panel 10ª corresponding to the panel 10 mentioned, and partial panels 11ª corresponding to the partial panels 11 of the member B, and when the members of the body are brought together the lower edges of said members fit snugly in the base or bottom recess 12, and the opposing longitudinal edges of the partial panels 11 and 11ª are brought close together so as to form jointly complete panels corresponding, preferably, in size to the complete panels 10 and 10ª above mentioned, and as is shown in Fig. 1.

A bail 13 is pivotally attached to the bottom or base A at the sides where the partial panels of the body meet, as is also shown best in Fig. 1. These bails 13 are of spring wire of suitable gage, and extend nearly to the top of the body of the box when in place. In connection with the bails 13, buttons 14 and 15 are employed; these buttons are located at the upper portions of the partial panels 11 and 11ª of the body of the box. The button 14 is a pivoted button, while the button 15 is a fixed button. The button 14 is shown carried by the partial panels 11 and the button 15 by the partial panels 11ª, the two buttons being practically in transverse alinement and the fixed button 15 extends upwardly and outwardly, as is shown in Figs. 1 and 2, being provided at its upper portion with an under cut recess 16, and when the pivoted button 14 is in locking position it extends in a direction substantially opposite to that of the fixed button 15.

In assembling the parts of the box, the members B and B' are brought together and are fitted at their lower ends at the base or bottom recess 12, then the pivoted buttons 14 having been carried downward the bails 13 are raised and are swung over the fixed buttons 15 entering the under cut recesses 16 of said fixed buttons, then the pivoted buttons 14 are turned so as to extend outward over said bails. After the plant has been sufficiently grown for transplanting, to remove the plant it is simply necessary to release the bails 13 from the pivoted buttons 14, spring them from the fixed buttons 15, 110 whereupon when the bails are carried outward, as is shown in Fig. 3, the members B and B' may be swung out in opposite directions so as to leave the bottom or base A, and likewise expose all sides of the earth that was contained in the body. In this manner it is possible to remove the plant with its mother earth undisturbed, thus greatly promoting the growth of the plant after transplanting.

It is frequently desired to grow several plants in the one box; to that end I provide a removable partition C for the box, shown in detail in Fig. 4. This partition consists of two or more, usually two, leaves 17 and 18 of equal size made of cardboard, straw-board, or the like, and each leaf at the central portion of opposite ends, is provided with a vertical cut 19, and then the leaves are brought together so that the central under cut portion of one leaf will be received in the corresponding cut portion of the other leaf. It will be understood that the leaves are of such dimensions and so shaped that when placed in a box they fit snugly to the panels thereof, as is shown in Fig. 1. When this partition is employed a number of plants can be individually grown in one box, and when the body of the box is dismantled each plant can be individually removed with its accompanying mother earth. It will further be understood that I do not confine myself to any particular material in the construction of either the box or the partition therefor.

Having thus described my invention, I claim as new and desire to secure by Letters Patent,—

1. A box for growing plants comprising a base and a body mounted upon the base, said body comprising separable members adapted in one position to swing outward from the base, and a bail pivoted to the base and adapted to swing upward against the side of the body, said body being provided with means for engaging the bail, whereby to lock the base and the body together.

2. In a box for growing plants, the combination with a base having a recess in its upper face and bails pivotally mounted on the said base adjacent its recess, of a body comprising two members independent of each other and independent of the base, said members when brought together having their lower ends fitted in the said base, and buttons carried at opposite sides of the said members for locking engagement with the said bails.

3. In a box for growing plants, the combination with a base and bails pivotally connected to the upper face of the said base, of a body constructed in separable members independent of the base yet having bearing thereon when the said members are brought together, and buttons carried by the said members for engagement with the said bails.

4. In a box for growing plants, the combination with a base having a recess in its upper face and bails pivoted at opposite sides of the said recess on the said base, of a body, the lower end of which is adapted to be fitted in the recess of the base, which body consists of two members, each comprising a full panel and two partial panels, the partial panels being adapted to be brought together when the body of the box is fitted to the base, a fixed button on each of the partial panels of one member of the body, and pivoted buttons on the partial panels of the opposing member of the body, the said buttons being adapted for locking engagement with the said bails.

5. In a box for growing plants, the combination with a base having a recess in its upper face and bails pivoted at opposite sides of the said recess on the said base, of a body, the lower end of which is adapted to be fitted in the recess of the base, which body consists of two members, each comprising a full panel and two partial panels, the partial panels being adapted to be brought together when the body of the box is fitted to the base, a fixed button on each of the partial panels of one member of the body, and pivoted buttons on the partial panels of the opposing member of the body, the said buttons being adapted for locking engagement with the said bails, and a partition removably located in the body of the box.

In testimony whereof I have signed my name to this specification in the presence of the subscribing witnesses.

NELSON HIGHT.

Witnesses:
    SEWALL W. ABBOTT,
    EARLE N. HIGHT,
    MARY A. HOYT.